United States Patent [19]

Tsutsumikoshi et al.

[11] Patent Number: 4,719,819
[45] Date of Patent: Jan. 19, 1988

[54] POWER TRANSMISSION SYSTEM FOR A VEHICLE

[75] Inventors: Shinobu Tsutsumikoshi; Yasuo Nagaike, both of Hamamatsu, Japan

[73] Assignee: Suzuki Motor Company Limited, Shizuoka, Japan

[21] Appl. No.: 758,117

[22] Filed: Jul. 23, 1985

[30] Foreign Application Priority Data

Feb. 18, 1985 [JP] Japan .................. 60-30053

[51] Int. Cl.⁴ .......................... F16H 3/02; F16H 3/08
[52] Int. Cl. .................... 74/745; 74/359; 74/331; 180/233
[58] Field of Search .......... 74/359, 360, 417, 391, 74/331, 745; 180/247, 297, 248, 249, 250, 233

[56] References Cited

U.S. PATENT DOCUMENTS

| | | | |
|---|---|---|---|
| 1,750,555 | 3/1930 | Whipp | 74/359 |
| 2,825,232 | 3/1958 | Sieving et al. | 74/359 |
| 3,029,661 | 4/1962 | Schmitter | 74/421 A |
| 3,580,350 | 5/1971 | Arkus-Dunton | 180/248 |
| 4,038,882 | 8/1977 | Keller | 74/359 |
| 4,427,088 | 1/1984 | Tsuboi | 74/359 |
| 4,441,575 | 4/1984 | Suzuki | 180/297 |
| 4,450,734 | 5/1984 | Makishima | 180/247 |
| 4,541,503 | 9/1985 | Akutagawa et al. | 180/247 |
| 4,635,506 | 1/1987 | Imaizumi et al. | 74/745 |

FOREIGN PATENT DOCUMENTS

| | | | |
|---|---|---|---|
| 48-42137 | 12/1973 | Japan . | |
| 0072631 | 5/1980 | Japan | 74/331 |
| 57-110529 | 7/1982 | Japan . | |
| 0118530 | 7/1984 | Japan | 180/251 |

Primary Examiner—Leslie Braun
Assistant Examiner—Dirk Wright
Attorney, Agent, or Firm—Birch, Stewart, Kolasch & Birch

[57] ABSTRACT

An improved power transmission system for use with a light saddle-type vehicle with an internal combustion engine of cross-mounted type has an improved construction such that there are provided a split type crank case adapted to be split generally centrally into two counterparts in the vertical way, an output shaft mounted on the bottom of and extending along a splitting line of the crank case, and a bevel gear transmission disposed intermediate the output shaft and a secondary drive shaft so that the driving power on the secondary drive shaft from the engine may be transmitted operatively to the output shaft through the bevel gear transmission, and/or that there is provided an auxiliary transission mounted outwardly of an outer bearing means of the transmission housed in the case, and adapted to provide a substantially large overall gear ratio making an increased stage of gear shifting available in the operation of the vehicle, whereby the maneuverability of the vehicle can be improved substantially.

2 Claims, 18 Drawing Figures

F I G. 15 (A)
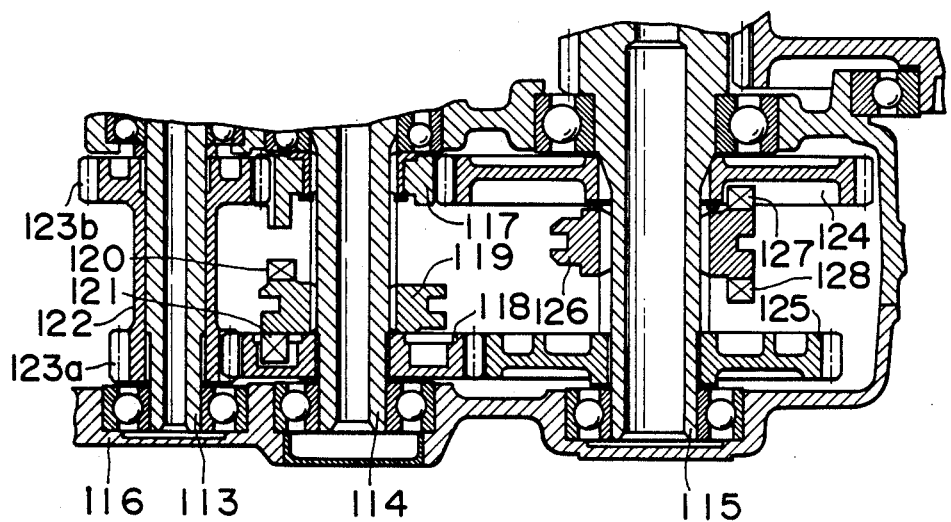
F I G. 15 (B)
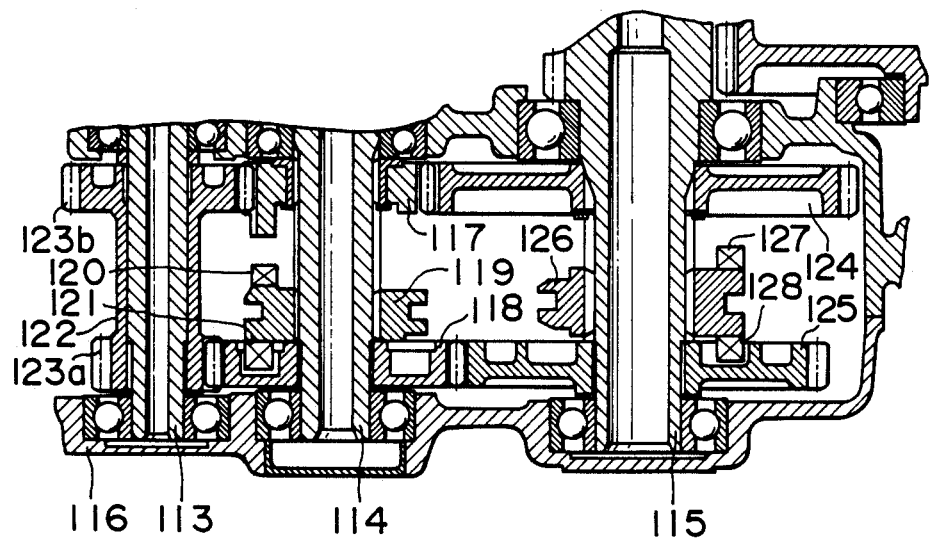

POWER TRANSMISSION SYSTEM FOR A VEHICLE

BACKGROUND OF THE INVENTION (i) Field of the Invention

The present invention relates to the improvement in or relating to a power transmission system for a relatively small vehicle, and more particularly to an improved power transmission system for use with a four-wheeled light vehicle of the type called a saddle wheeler.

(ii) Description of the Prior Art

There is shown in general view a typical four-wheeled light vehicle of saddle type in FIG. 1.

It is generally designed in this saddle type four-wheeled vehicle designated at the reference numeral 1 that there are mounted a pair of balloon tires 2 and 3 of a relatively low pressure adaptable for driving operation on the irregular grounds such as deserts or wilds on the front and rear axles of this vehicle, respectively. It is also known that this saddle type vehicle 1 is generally equipped with a handlebar 4 for its steering operation, and that this handlebar 4 is designed to cause the front axle and hence the front pair of balloon tires 2, 2 to be steered for changing the heading of the vehicle by way of a steering mechanism, for example, the Ackermann steering mechanism, not shown, mounted in the vehicle's body 5. It is also the practice that there is mounted an internal combustion engine 7 in a transversal relationship across a frame 6 of a vehicle's body 5 with its crank axis disposed at the right angle with respect to the direction of heading of the vehicle 1 shown by an arrow A.

FIG. 2 is a plan view of a crank case 8, with main parts cut-away, showing the general construction of a conventional power transmission mechanism for use with the engine 7 to be adapted in the saddle type vehicle as noted above, and more particularly showing a typical construction of the so-called shaft-driving mechanism 9 for the secondary power transmission of the engine.

Now, referring more specifically to the construction of this power transmission system for the engine 7, it is seen that the motive power or rotating power of the crank shaft 10 of the engine 7 generated from the internal combustion is initially transmitted to a counter-shaft 12 through a clutch mechanism 11 incorporated in the engine's crank casing, and the rotating power of the counter-shaft 12 is then transmitted further to a drive shaft 15 by way of driving gears such as a driving gear 13 and a driven gear 14 being meshed with the driving gear 13. Also, the rotating power is further transmitted from the driving shaft 15 through driving gears 17, 18 in a speed change gear or transmission 16, which is disposed on the left-hand extension of the driving shaft 15, and driven gears 19, 20 meshing respectively with the driving gears 17, 18 to a secondary drive shaft 21. It is known that the driving gears 17, 18 are arranged to be shifted to a desired speed ratio by a gear shifting operation. The driving power of this secondary drive shaft 21 is then directed to a shaft-driving mechanism 9 by way of a bevel-gear transmission 24 which is disposed on one end of the secondary drive shaft 21, and in which there are provided a pair of bevel gears 22, 23 in a right-angled transmission relationship. This shaft drive mechanism 9 is known further comprising a propeller shaft and the like not shown, which is adapted to drive either of the front or rear axles, and hence either of the front or rear pair of balloon tires 2, 2 or 3, 3 shown in FIG. 1.

On the other hand, according to the conventional arrangement of power transmission system as adapted to this type vehicle, there may be employed such an alternative design that there are provided a driving sprocket (not shown) on the extension of the secondary drive shaft 21, in place of the bevel-gear transmission 24, and a driving chain (not shown) extending operatively across this sprocket and complementary one mounted on either of the front or rear axle so that either of the front or rear pair of balloon tires 2, 2 or 3, 3 may be driven for rotation.

According to such a typical construction of the conventional power transmission system as reviewed hereinbefore, it is noted that the secondary transmission mechanism from which either of the front or rear pair of balloon tires 2, 2 or 3, 3 shown in FIG. 1 may be driven in rotating motion, and which comprises the bevel-gear transmission 24, the shaft driving mechanism 9 and the like is generally disposed projecting laterally on an either hand of the crank casing 8 (in the illustrated example, the left hand side). Because of such an arrangement of lateral projection, an overall width W across the lateral extension of the engine 7 plus the power transmission casing would then turn out to be extremely greater, thereby resulting in an obstacle to the compact design of the entire engine and power transmission group of parts. More particularly, when adapting to the so-called front-wheel-drive system, in which the motive power of the secondary transmission is taken in the front of the engine 7 or in the direction shown by the arrow A, it would then be required to have the engine 7 mounted in the reverse way to the engine setting position as shown in FIG. 2. With such an engine mount, it is quite natural that the weight distribution of the saddle-type vehicle 1 would likely turn to be shifted towards the rear part thereof, which would then spoil substantially the stability of the light vehicle.

By the way, it is generally the practice in the design of a power transmission system for use with an ordinary automotive vehicle for the so-called on-road uses that the nominal ratio of the reduction gear ratio of a first speed position or a low gear position to the reduction gear ratio of a highest speed position or a top gear position is set to be from 3 to 4.

In contrast, however, it is specifically essential for the vehicles adapted to the operation on irregular ground or the so-called off-road vehicles that an auxiliary transmission is employed in addition to the transmission of ordinary change gear ratio specification, in order to obtain an extraordinarily extensive range of speed changes which is generally required for such uses.

More specifically, according to a typical construction for providing such an extraordinarily wider range of gear ratios, there are generally provided a primary drive shaft 101 and a secondary drive shaft 102 with a further elongated extension thereof, on the elongated extension of which drive shafts four gears 103 through 106 are installed, with two gears on each of the shaft extensions, and there is also provided a sliding wheel 107 which is adapted to switch the engagement between the gears 103 and 104, whereby there is attained an effect of auxiliary shifting in addition to the ordinary gear shift operation, accordingly.

With this construction, however, as there is attained only two steps of gear shifting, and moreover, as it was impossible to make these gears 103 and 104 smaller than the sliding wheel 107 because of the dimensional limit in strength, it was not feasible in practice to obtain a greater gear ratios than desired. In the design of the vehicle adapted to the operation on irregular ground, it is preferred to have a nominal ratio of the reduction gear ratio of the first speed or low gear position to the reduction gear ratio of the highest speed or top gear position being somewhere about 10 or so. However, under such a restriction in the design of an auxiliary transmission of the conventional construction as noted above, there is merely attained a nominal ratio of 4.5 to 6 at the most.

In consideration of such drawbacks particular to the conventional construction of the power transmission system for a light saddle type vehicle as noted above, it would be desirable to attain an efficient resolution for overcoming such inevitable problems particular to the conventional construction.

The present invention is essentially directed to the provision of a due and proper resolution to such inconveniences and difficulties in practice as mentioned above and experienced in the conventional power transmission system which have been left unattended with any effective countermeasures therefor.

SUMMARY OF THE INVENTION

The present invention is therefore materialized to practice in view of such circumstances and inconveniences as noted above, and it is an object to provide an improved power transmission system for use with a light saddle-type vehicle, which can be designed to be compact, requiring no change in the engine mounting position, and making it possible to take out the engine power in either front or rear directions of the vehicle.

It is another object of the invention to provide an improved power transmission system for use with a light saddle type vehicle, which is adapted to be mounted on the outside of an output bearing of the transmission, and which can provide an auxiliary transmission having four steps of speed changes made available, thus producing an extraordinarily wider range of nominal ratios covering from the human pedestrian speed to a desired highest speed.

The gist of the present invention for attaining the objects noted above resides essentially in the following aspects summarized in brief, as follows.

(1) According to the present invention, there is provided an improved power transmission system for use with a light saddle type vehicle, which comprises a split type crank case adapted to be split centrally into two pieces in the vertical way, an output shaft of a secondary transmission means mounted on the bottom of and extending along a splitting line of the crank case, and a bevel gear transmission disposed intermediate the output shaft and a secondary drive shaft in such a manner that the output shaft and the bevel gear transmission and the sedonary drive shaft may be connected operatively with each other, so that a motive power transmitted to the secondary drive shaft may be transferred efficiently to the output shaft by way of the bevel gear transmission.

(2) Also, there is provided an improved transmission system for use with a light saddle type vehicle including a cross-mounted engine having its crank shaft disposed across the longitudinal axis of a body of the vehicle, which comprises an output shaft means of a secondary transmission means disposed generally centrally on the bottom of a crank casing means of the engine and extending in the longitudinal direction of the body of the vehicle, a drive shaft and a counter shaft having extensions held outwardly from and rotatably by outer bearing means provided on an outer end of the transmission means, two gear means mounted loosely movably relatively to the extension of the drive shaft means, a first sliding wheel means mounted slidably between the two gear means so as to selectively come into operative engagement with either of the gear means, a gear means mounted loosely movably relative to the extension of the counter shaft and having two gears teeth spaced from each other and adapted to be in meshing with the gear means on the drive shaft means, respectively, two gear means mounted movably relative to the secondary drive shaft means and having two gear teeth in meshing with the two gear means on the drive shaft means, and a second sliding wheel means mounted slidably between the two gear means on the secondary drive shaft means and adapted to selectively come into engagement with either of the two gear means, whereby a different gear ratio is obtained by selectively shifting in sliding motion the first and second sliding wheel means to a desired position of engagement with the complementary of the gear means.

By the provision of such an advantageous construction according to the present invention as noted above, there may be attained such advantageous effects as follows:

(1) By the adoption in practice of the improved transmission system embodying the present invention, the crank case of an engine to be mounted in a transversal position orthogonally across the longitudinal axis of a vehicle's body may be designed to be a relatively small projection across the vehicle's body, thus making it feasible in practice to design the entire engine to be compact in dimensions in the lateral direction, and the engine's motive power can be taken out from either of the front and rear sides of the engine without affecting the mounting position of an engine, thus making it possible to employ with ease either of the front or rear wheel driving arrangement, or of the four-wheel drive system in a light vehicle.

(2) With the advantageous construction of the auxiliary transmission according to the invention, it is possible in practice to have a relatively large nominal ratio as noted above made available, as well as greater number of stages of speed shifts, thus improving the maneuverability of a vehicle, accordingly. Also, when compared with the conventional auxiliary transmission, a relatively low production cost may be attained merely with the provision of an elongated countershafting and with the adoption of two gears more. Also, according to the advantageous construction of the invention, the auxiliary transmission can be designed to be includable within a magnet cover of a power generator casing without requiring any other casing, thus making the compactness of the entire construction furthered, as desired.

Additional features and advantages of the invention will now become more apparent to those skilled in the art upon consideration of the following detailed description of a preferred embodiment exemplifying the best mode of carrying out the invention as presently perceived. The reference is now made in the following detailed description to the accompanying drawings, in

DETAILED DESCRIPTION OF THE PREFERRED EMBODIMENT

The present invention will now be explained in detail by way of preferred embodiments thereof as being adapted in practice to a power transmission system for use with a light four-wheeled vehicle of saddleriding type in conjunction with drawings accompanying herewith.

(First Embodiment of the Invention)

Figure 2:
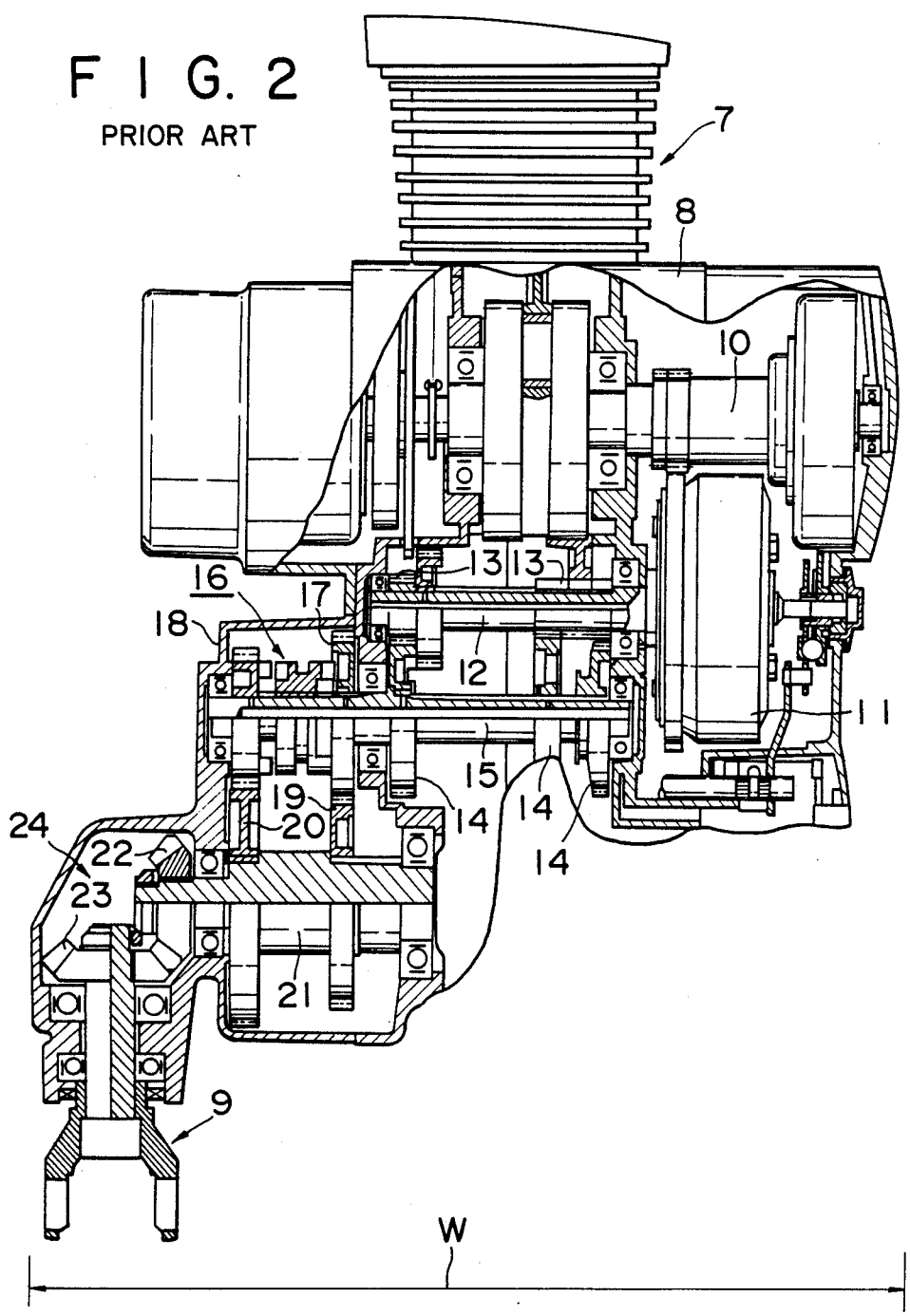
FIG. 2 is a general development showing, partly cut-away, main portions of an engine and a conventional power transmission system constructed in combination.
Figure 4:
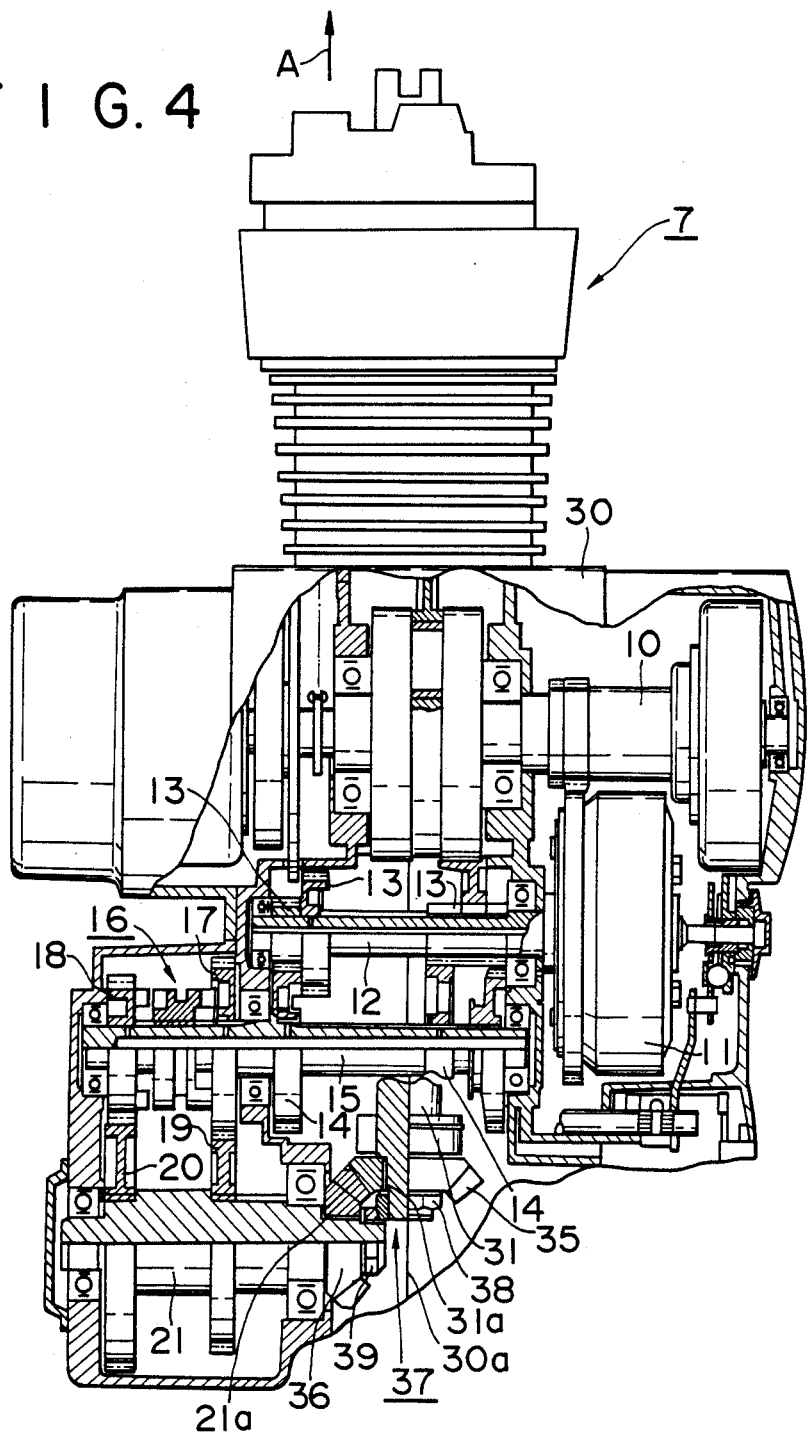
FIGS. 4 and 5 are general development showing, partly cut-away, main portions of an improved power transmission apparatus constructed in combination with an engine by way of a first embodiment of the invention, respectively.
Figure 5:
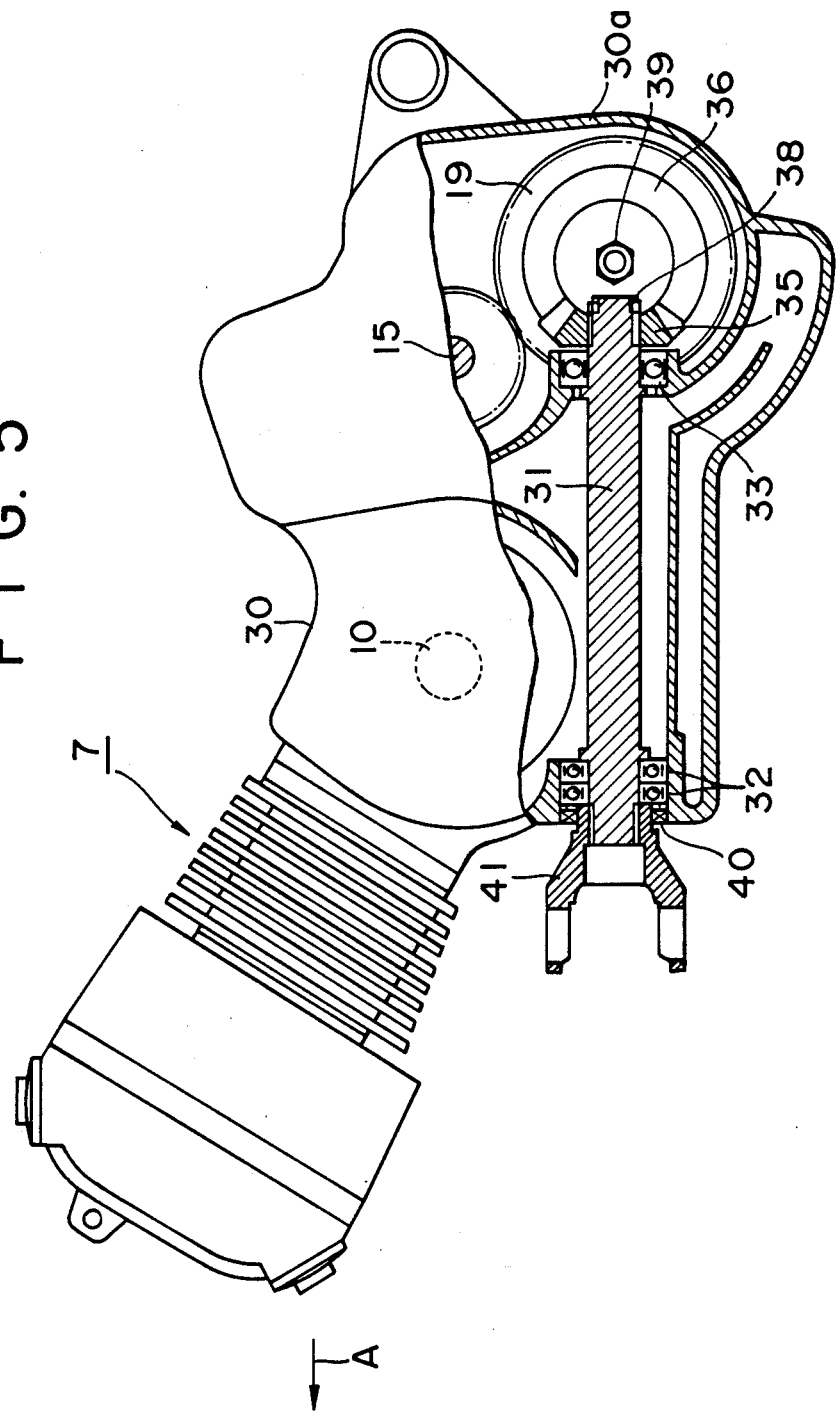

In FIGS. 4 and 5, there is shown, partly cut-away, the development of main portions of an internal combustion engine 7 with a power transmission system incorporated in combination therein according to the present invention, in plan view and in side elevation, respectively, in which like parts are designated with like reference numerals as in FIG. 2.

It is shown that a crank case designated at a reference numeral 30 of the engine 7 is of a longitudinally-split type, which is designed to be split into right and left counterparts in a boundary or joint surface 30a extending longitudinally and generally at the center thereof so as to be assembled together. There is also shown an output shaft designated at 31 of a secondary transmission disposed generally in the center of the crank case 30 and extending in the front of the engine 7 or in the direction shown by an arrow A. On the other hand, as typically shown in FIG. 5, there are mounted bearings 32, 33 in the front and rear positions of the crank case 30 in the recesses provided in the joint surface 30a of the crank case, respectively, which are adapted to rotatably receive the output shaft 31 stated above. Also, in FIG. 4 there are shown provided fixedly a pair of bevel gears 35, 36, respectively, on one end of the output shaft 31 and on an end of a secondary drive shaft 21 by way of splines 31a and 21a, which work together as a bevel gear transmission mechanism 37. With this power transmission arrangement of the construction as noted above, the motive or driving power transmitted to the secondary drive shaft 21 from the engine 7 is then transmitted to the output shaft 31 of the secondary transmission by way of the bevel gear transmission 37, from which output shaft 31 the driving power from the engine 7 may be taken readily out on the front side of the saddle type vehicle 1 as generally shown by the arrow A in FIG. 1.

Referring now to FIG. 4, shown at the reference numerals 38, 39 are nuts, which are adapted to securely fix the bevel gears 35, 36 in position of the output shaft 31 and the secondary drive shaft 21, respectively. Shown in FIG. 5 by the numerals 40 is an oil seal, by which oil seal the bearings 32, 32 are sealed tightly in the crank case 30. Also shown at 41 in FIG. 5 is a joint which is fixed on one end of the output shaft 31, through which joint a shaft-drive mechanism comprising a propeller shaft not shown is driven in rotation for the propelling motion of the vehicle 1.

Figure 1:
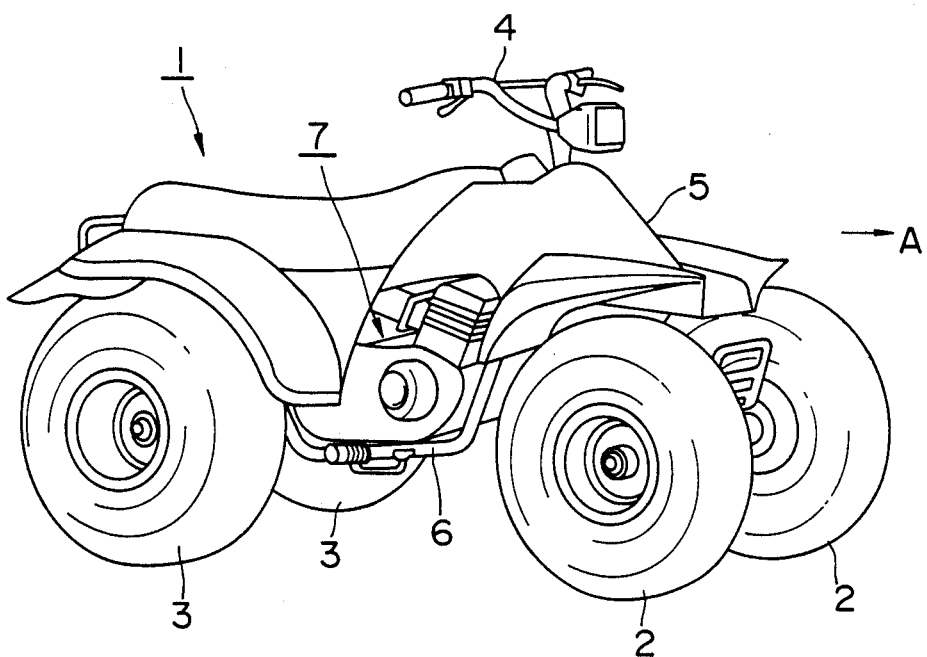
FIG. 1 is a schematic general view showing, in perspective, the general appearance of a light four-wheeled saddle type vehicle.
Figure 3:
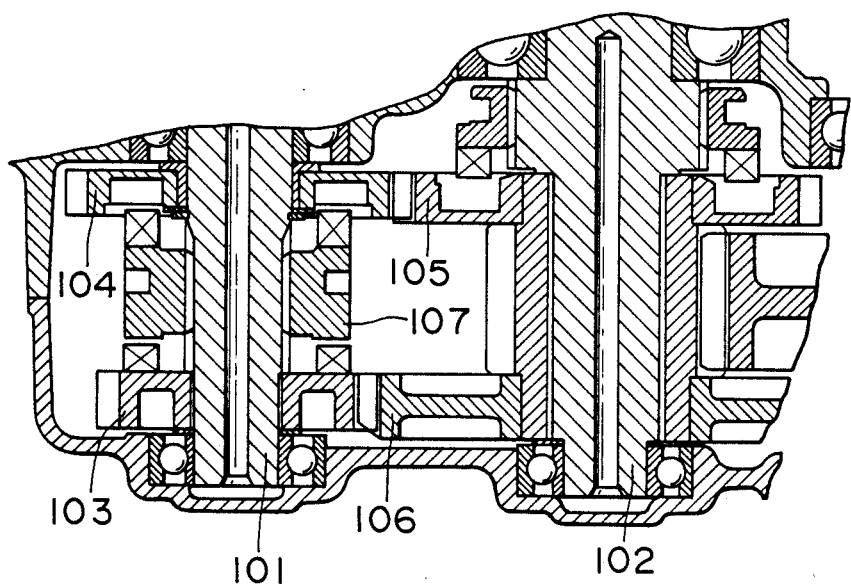
FIG. 3 is a fragmentary cross-sectional view showing an auxiliary transmission of conventional construction.

According to this particular embodiment of the invention, there was shown the general arrangement of a power transmission system as adapted in the so-called front-wheel-drive system, wherein the power transmission is arranged with a power train such that there is mounted the output shaft 31 in the front of the crank case 30 of the engine 7 as shown mounted upon a body framing 6 of the four-wheeled saddle-type vehicle 1 shown generally in FIG. 1, from which output shaft a front axle, and hence a pair of front balloon tires 2 are driven for rotating motion by aid of the shaft drive mechanism, not shown, which is operatively connected to the output shaft. It is of course feasible in practice to adapt the power transmission system according to the invention to the so-called four-wheel-drive system, wherein the both front and rear wheels of the four-wheeled vehicle 1 are operatively driven from the engine, without being restricted to the particular embodiment as noted hereinbefore.

(Second Embodiment of the Invention)

Figure 6:
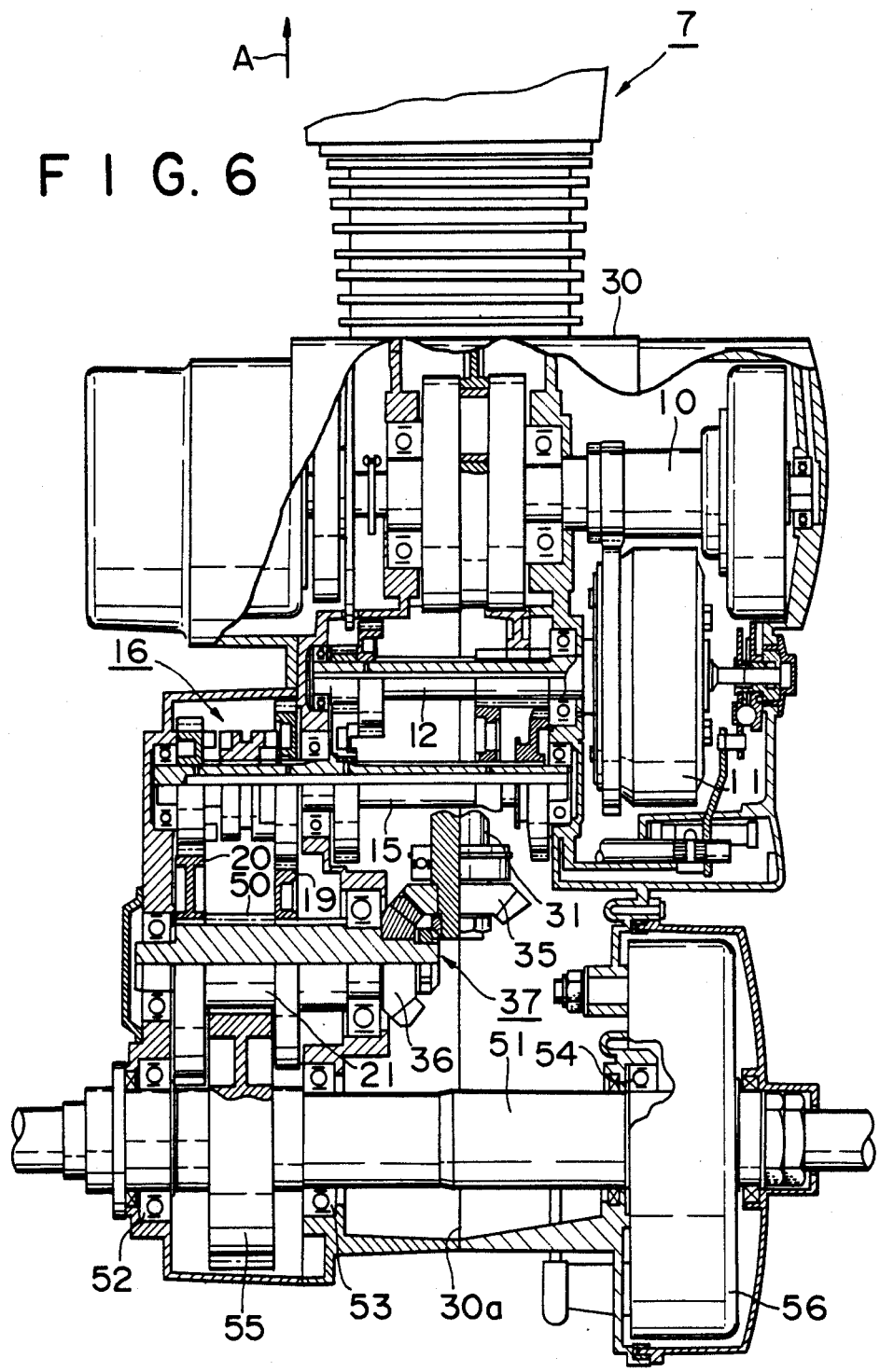
FIGS. 6 and 7 are similar general development to FIGS. 4 and 5 showing a second embodiment of the invention, respectively.
Figure 7:
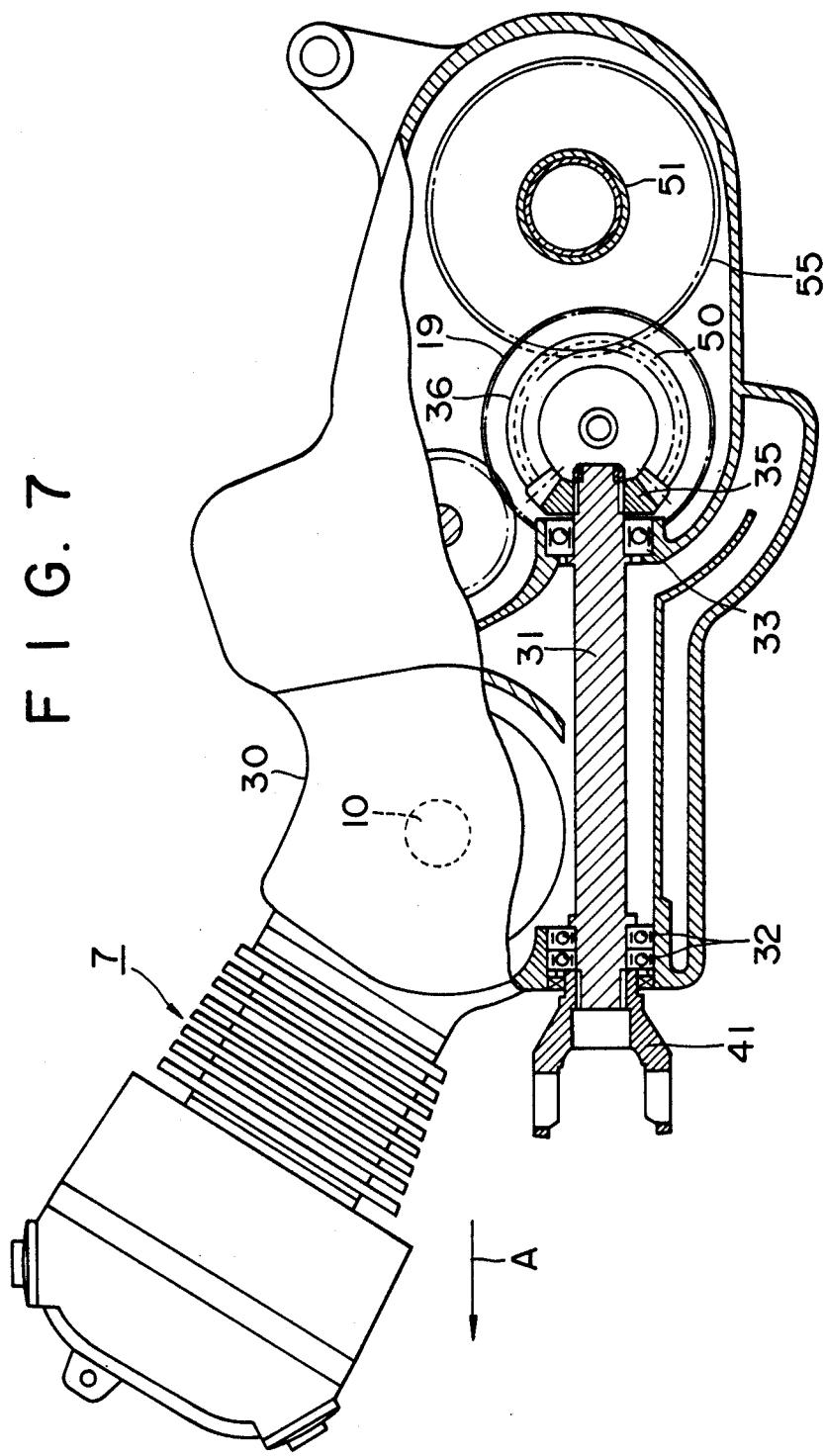

According to FIGS. 6 and 7 which show the general development, in side elevation and plan views partly cut-away, of an improved power transmission system by way of a second embodiment of the invention, respectively, which is incorporated integrally in the crank casing structure of the engine 7, and which is adapted to the four-wheel-drive system. In these drawing figures, like parts are designated at like reference numerals as in FIGS. 4 and 5.

Referring more specifically to this arrangement of an improved power transmission system, there is provided a drive gear 50 which is formed as a unit with the secondary drive shaft 21 and disposed in operative engagement with driven gears 19, 20 mounted fixed on the secondary drive shaft 21. Also, shown is a rear axle shaft at 51 in the rear part of the crank case 30 of the engine 7, which is received rotatably by bearings 52, 53 and 54. Also, on the rear axle shaft 51 there is provided a driven gear 55 adapted to be driven together therewith, this driven gear 55 being in meshing engagement with the drive gear 50 provided on the secondary drive shaft 21. Now in FIG. 6, there is seen a brake mechanism designated at 56 for the rear axle shaft 51.

According to this arrangement as reviewed above, there is provided such a path of power transmission that the driving power on the secondary drive shaft 21 is transmitted to the output shaft 31 by way of the bevel gear transmission 37, and is also transmitted to the rear axle shaft 51 through the drive gear 50 and the driven gear 55 in meshing engagement with the drive gear 50.

Figure 8:
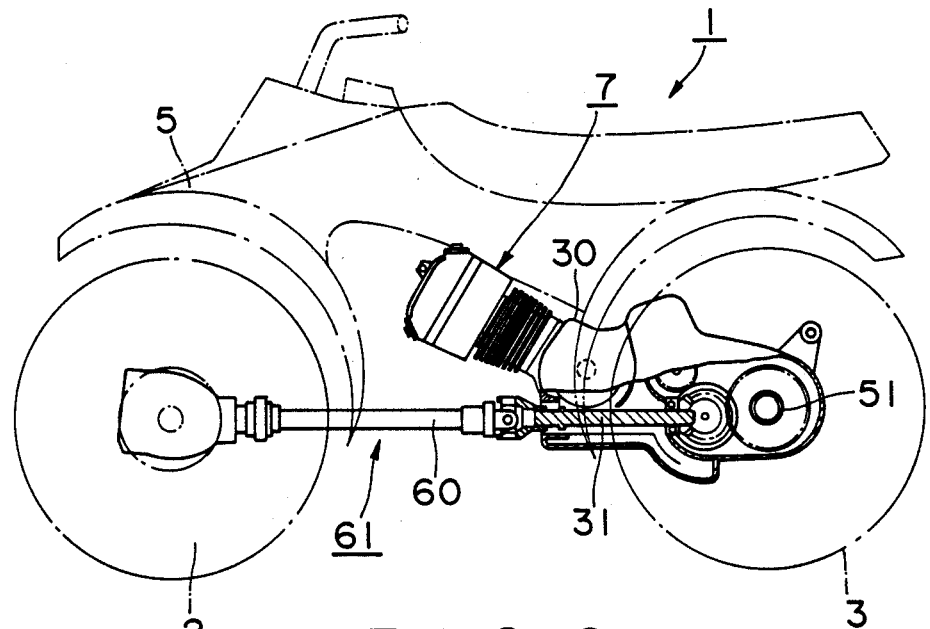
FIG. 8 is a conceptual view showing, in side elevation, the general arrangement of an improved engine and power transmission system in combination shown in FIG. 7, when mounted in a saddle type four-wheeled vehicle.

When the engine 7 with the power transmission system incorporated therein is installed upon the four-wheeled saddle type vehicle 1 shown in FIG. 1, the four-wheeled saddle type vehicle 1 is provided with the fourwheel drive system as schematically shown in FIG. 8.

Figure 9:
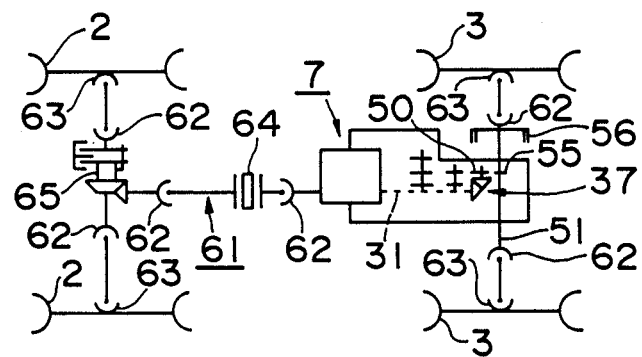
FIG. 9 is a schematic general view showing, by way of skeleton scheme, the path of power transmission of the arrangement shown in FIG. 8.

In this arrangement of the four-wheeled saddle type vehicle 1, it is shown that the front pair of balloon tires 2, 2 are operatively connected to the power transmission system by way of the output shaft 31 and a shaft drive mechanism 61 which comprises a propeller shaft 60 connected operatively to this output shaft 31. Now, on the part of the rear pair of balloon tires 3, 3, there is provided such a path of power transmission from the transmission system through the rear axle shaft 51 and other aids such as a coupling-joint and the like, not shown. With this path of power transmission of the four-wheeled saddle type vehicle 1 of FIG. 8, which is schematically shown by way of the skeleton scheme in FIG. 9, the motive power from the engine 7 is transmitted to the front pair of balloon tires 2, 2 by way of the bevel gear transmission 37, the output shaft 31, the shaft drive mchanism 61 and the like members. It is also seen that the driving power from the engine 7 is transmitted to the rear pair of balloon tires 3, 3 by way of the power transmission route consisting of the drive gear 50, the driven gear 55, the rear axle shaft 51 and the like, thus having all the four wheels driven concurrently, which is known as the so-called four-wheel-drive. Incidentally, there are schematically shown provided a universal joint 62, a ball joint 63, a coupling gear 64 and a differential gear 65.

According to this specific embodiment noted hereinbefore, the motive power from the engine 7 is taken out only from the front side shown by an arrow A in FIG. 7 by means of the output shaft 31 so as to drive the front pair of balloon tires 2, 2 of the four-wheeled saddle type vehicle 1, while having the rear pair of balloon tires 3, 3 driven immediately by way of the route of power transmission of the drive gear 50 and the driven gear 55, whereby the saddle type vehicle 1 may be provided with the four-wheel-drive system, accordingly. While not expressly shown, an alternative arrangement is also practicable in which the driving power from the output shaft 31 of the power transmission system according to the present invention may be adapted alone to provide the four-wheeled saddle type vehicle 1 with the four-wheel-drive system.

(Third Embodiment of the Invention)

Figure 10:
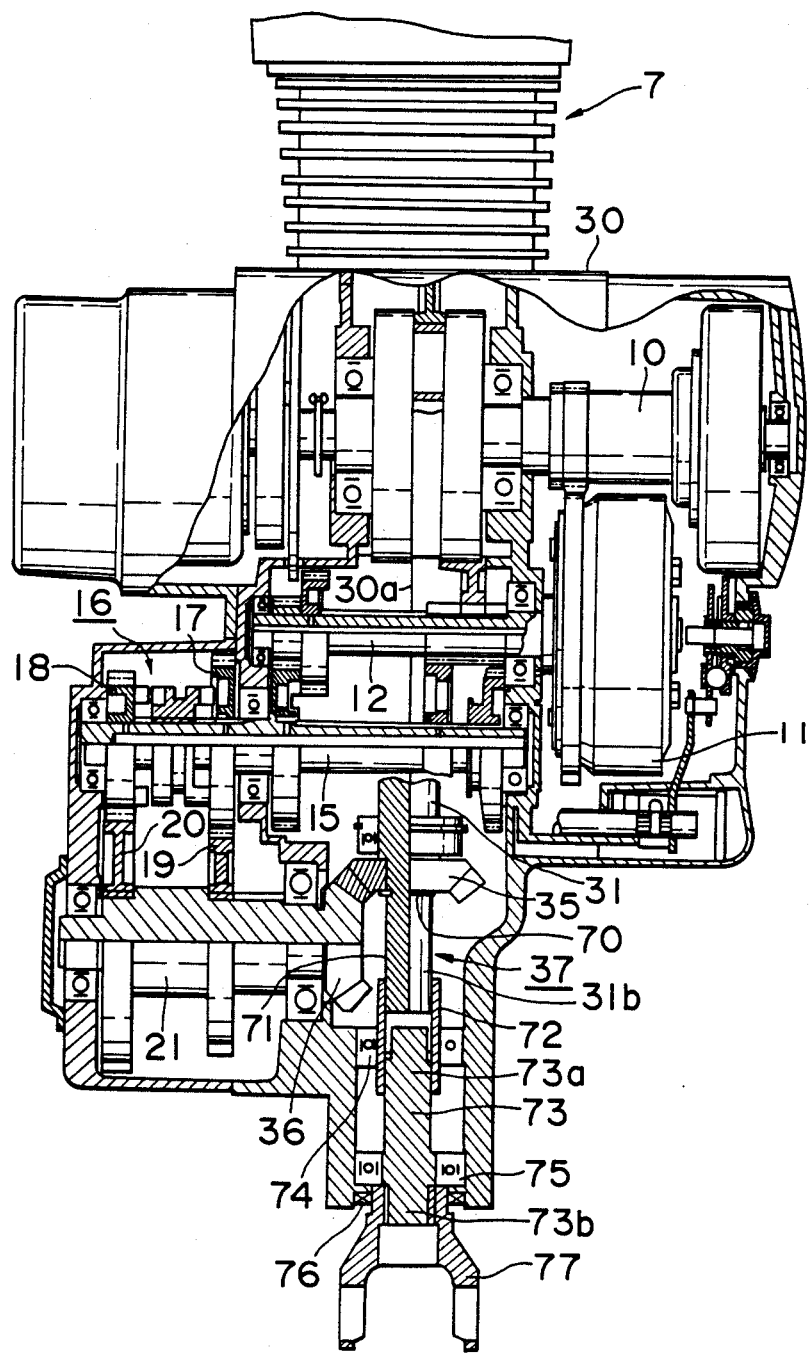
FIGS. 10 and 11 are similar general development to FIGS. 6 and 7 showing, partly cut-away, a third embodiment of the invention, respectively.
Figure 11:
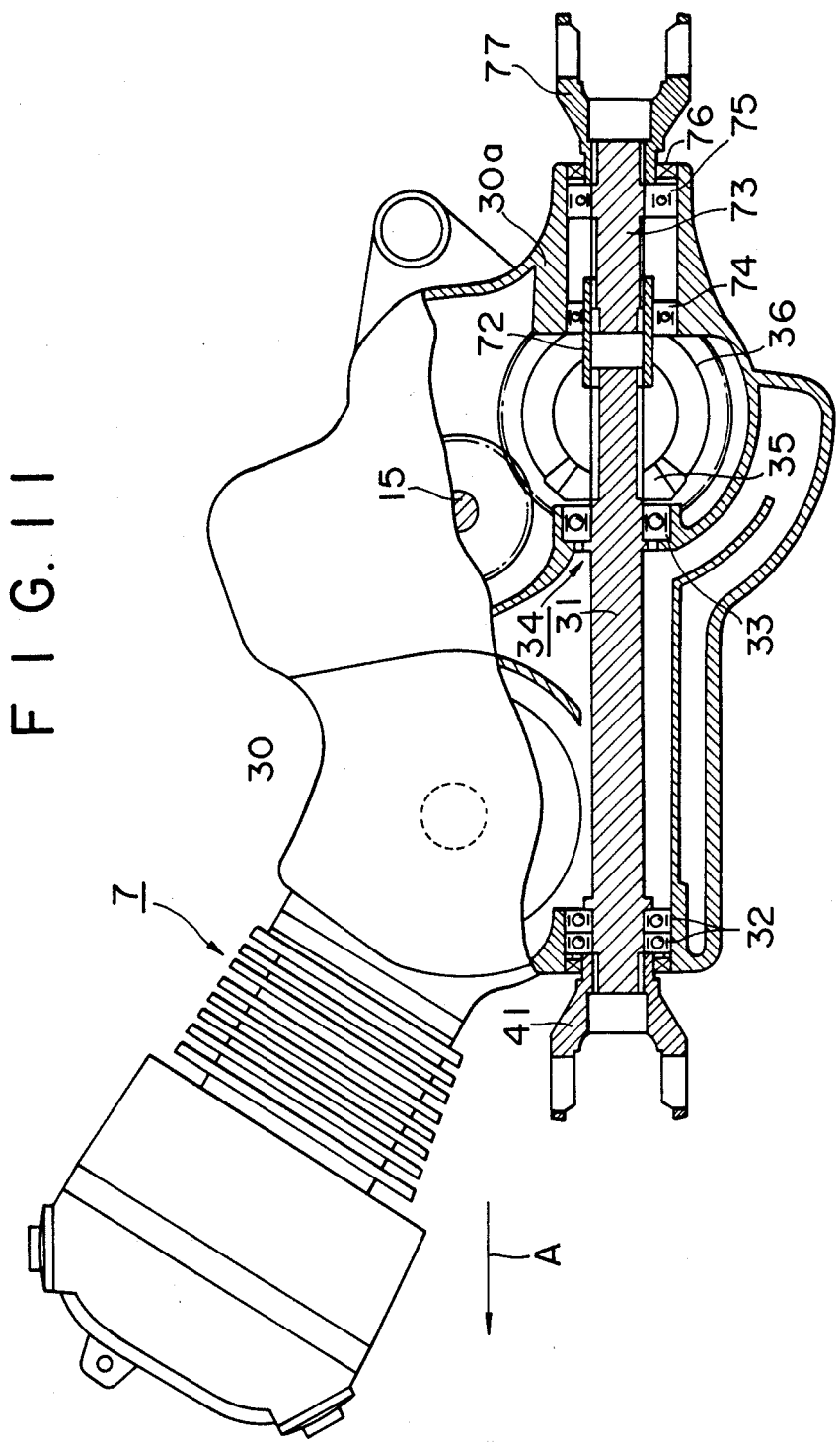

Now, according to FIGS. 10 and 11, which show the general development, in plan view and side elevation partly cut-away, of an improved power transmission system by way of a third embodiment of the invention, there is seen provided a specific arrangement of power train, in which the engine power on the output shaft 31 may be taken out from the both front and rear sides of the engine 7. In FIGS. 10 and 11, like parts are designated at like reference numerals as in FIGS. 4 and 5.

With this particular arrangement of an improved power transmission system, there is shown provided a bevel gear 36 integrally on one end of the secondary drive shaft 21, and another bevel gear 35 which is complementary with the bevel gear 36 is seen disposed in position on the output shaft 31 by using a retaining clip or ring 70, which bevel gear 35 is naturally secured rigidly with respect to the output shaft 31 by using splines 71 formed in the circumference of the shaft 31. These bevel gears 35 and 36 meshing complementarily with each other are designed to comprise a bevel gear transmission mechanism 37 as an essential part of the entire power transmission system. On the other hand, one end 31b of the output shaft 31 is designed extending in the rear direction from the engine 7, upon which end 31b there is provided a secondary output shaft 73 to be connected as a unit by aid of a sleeve 72 splined to the end 31b. This secondary output shaft 73 is also connected to the sleeve 72 on its one end 73a in the similar manner to the end 31b of the output shaft 31. Also, this secondary output shaft 73 is received rotatably by bearings 74. 75 disposed in position centered in the joint surface 30a in the rear part of the crank case 30 as viewed in an opposite direction in FIG. 11. The other end 73b of the secondary output shaft 73 is seen projecting outwardly from the crank case 30 having an oil seal 76 mounted therearound at the end of the rear extension of the crank case 30, and having a joint-half 77 on the end 73b. In this specific arrangement, the output shaft 31 and the secondary output shaft 73 are formed independently from each other so as to be connected with each other by aid of the sleeve 72. It is naturally possible in practice that these shafts 31 and 73 may be formed as a unit, without being restricted to this particular arrangement at all.

Now, referring to the power transmission system according to this particular arrangement, the motive power on the secondary drive shaft 21 can be transmitted to the output shaft 31 and the secondary output shaft 73 by way of the bevel gear transmission 37, respectively, whereby the engine power may be taken out from the both front and rear sides of the engine 7 as shown typically in FIG. 10.

Figure 12:
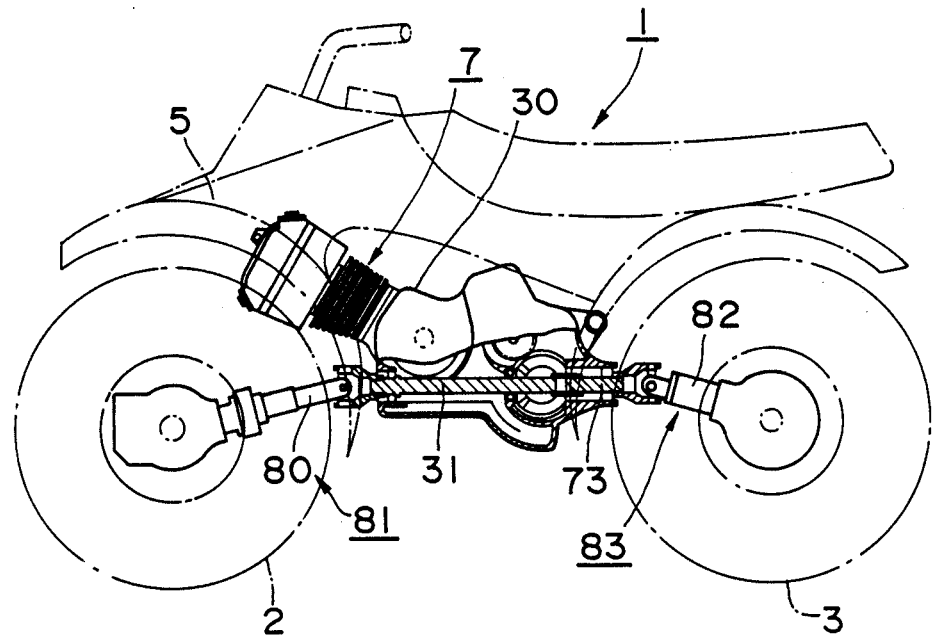
FIG. 12 is a similar conceptual view to FIG. 8 showing, in side elevation, the general arrangement of an improved engine and power transmission system in combination shown in FIG. 11, when mounted in a saddle type four-wheeled vehicle.
Figure 13:
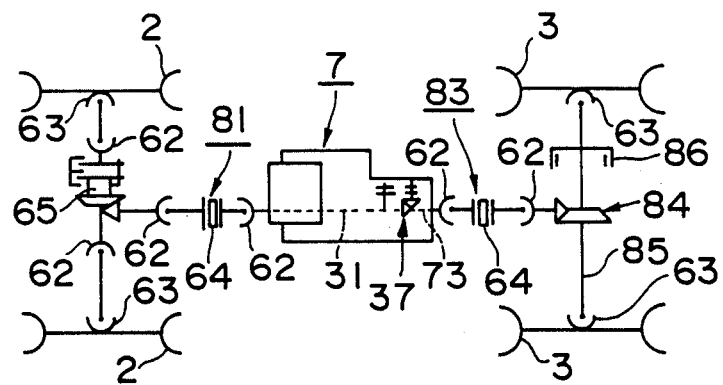
FIG. 13 is a schematic general view showing, by way of skeleton scheme, the path of power transmission of the arrangement shown in FIG. 12.

When mounting the engine 7 incorporating the power transmission system according to this specific embodiment shown in FIGS. 10 and 11 onto the four-wheeled saddle type vehicle 1 of FIG. 1, there is provided the four-wheeled saddle type vehicle 1 with the four-wheel-drive system as practiced in the embodiment shown in FIGS. 12 and 13, accordingly.

In the arrangement of the four-wheeled saddle type vehicle 1 shown generally in FIG. 12, it is seen that the front pair of balloon tires 2, 2 of the vehicle are connected operatively to the power transmission system through a shaft-drive mechanism 81 which comprises a propeller shaft 80 and the like members. Also shown is the power transmission arrangement on the part of the rear pair of balloon tires 3, 3 of the vehicle, which are seen connected operatively to the power transmission system by way of a shaft-drive mechanism 83 which comprises the secondary output shaft 73 and a propeller shaft 82 connected thereto. With such a route of power transmission as schematically shown in the skeleton scheme of FIG. 13, the driving power from the engine 7 is transmitted to the output shaft 31 and the secondary output shaft 73 by way of the bevel gear transmission 37, and further to the front pair of balloon tires 2, 2 and the rear pair of balloon tires 3, 3 through the shaft drive mechanism 81 connected operatively to these shafts 31, 73, whereby the four wheels may eventually be driven in concurrent tractive motion. According to FIG. 13, there are shown provided a bevel gear transmission 84 disposed between a rear axle shaft 85 and the secondary output shaft 73, and a brake mechanism for the rear axle shaft 85. In FIG. 13, like parts are designated at like reference numerals as in FIG. 9.

While the foregoing description on the preferred embodiments of the invention is essentially directed in the power transmission system adapted exclusively to the four-wheeled saddle type vehicle 1, it is to be understood that the present invention be not restricted in application to these embodiments thereof, but rather may be adapted to other vehicles like a passenger car or a light truck to an equal effect, accordingly.

(Fourth Embodiment of the Invention)

Figure 14:
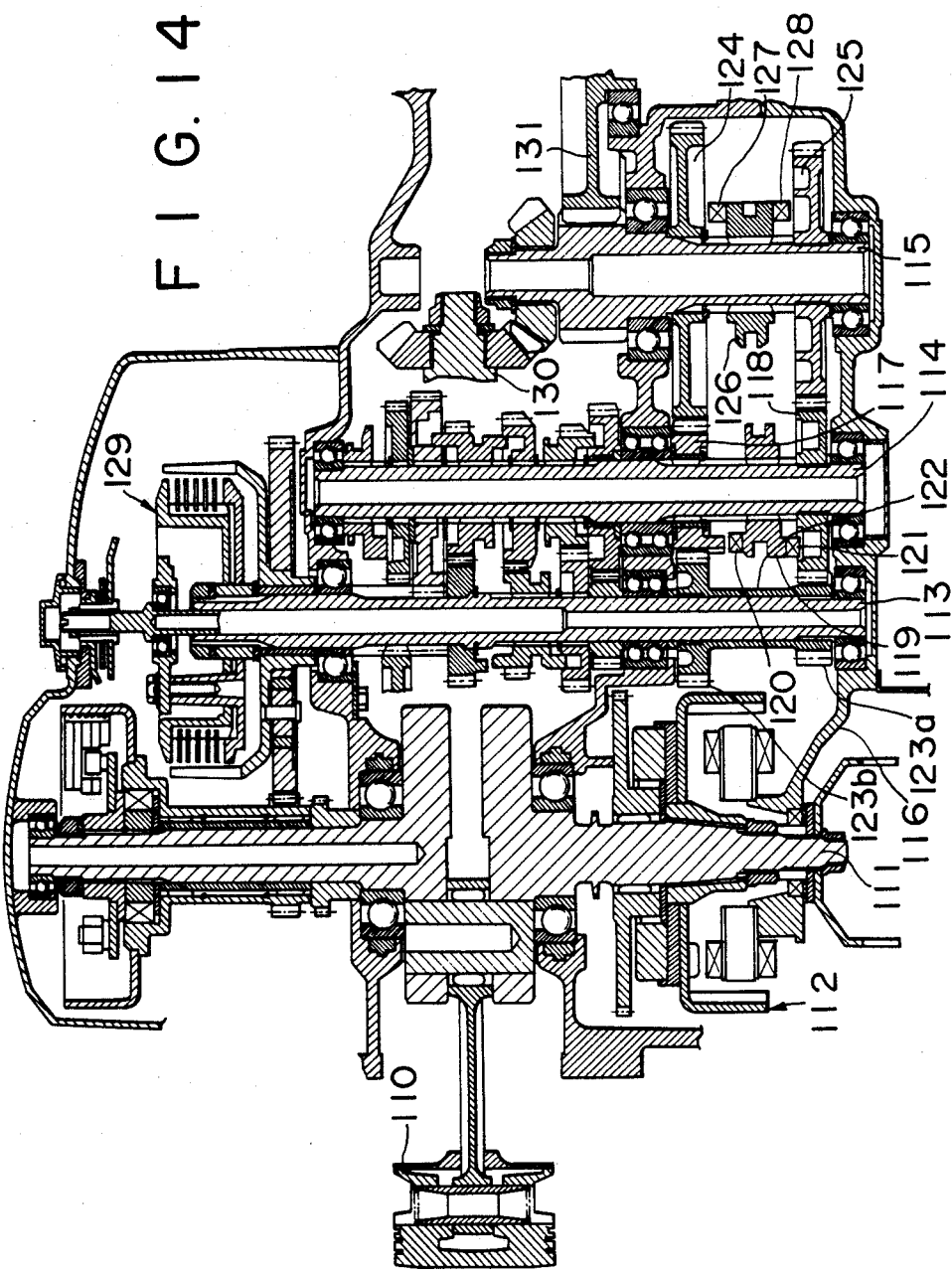
FIG. 14 is a general cross-sectional view showing an improved auxiliary transmission incorporated in a power transmission system constructed by way of a fourth embodiment of the invention.

In FIG. 14, there is shown an improved power transmission system by way of a fourth embodiment of the invention, which incorporates an auxiliary transmission therein, and in which there are shown provided a piston 110, a crank shaft 111, a power generator 112, a counter shaft 113, and a drive shaft 114 and a secondary drive shaft.

Referring more specifically to the construction of an auxiliary transmission as incorporated in the improved power transmission system according to the invention, which is housed in a casing 116, in common use, of the power generator 112. There are also provided gears 117, 118 each mounted freely movably relative to the extension of the drive shaft 114. Shown between the gears 117 and 118 is a sliding wheel 119 which is mounted slidably longitudinally along the axis of the drive shaft 114. This sliding wheel 119 is formed with dog clutches 120, 121 on the circumferential sides facing the gears 117, 118 so that it may be put into engagement with either of these gears when shifted to a position of engagement as selected by an operator. A gear carrier or bobbin-shaped gear 122 is shown mounted upon the extension of the counter shaft 113, and it is formed with two spaced gears 123a and 123b adapted to engage in meshing with the gears 117 and 118, respectively. Also, the secondary drive shaft 115 has gears 124 and 125 mounted loosely movably thereto for meshing engagement with the gears 117 and 118, respectively. Between the gears 124 and 125 there is a sliding wheel 126 mounted slidably along the longitudinal axis of the secondary drive shaft 115 so that this sliding wheel 126 can selectively be put into a meshing relationship with either of the gears 124 and 125 by function of dog clutches 127 and 128 provided on the circumferential sides of the sliding wheel 126.

With the construction of the power transmission system incorporating the auxiliary transmission shown in FIG. 14, the route of power transmission is such that when the engine rotates, the driving motion of the piston 110 is transmitted through the crank shaft 111, a clutch mechanism 129, the counter shaft 113, the drive shaft 114 and the auxiliary transmission according to the invention to the secondary drive shaft 115, and eventually to a front output shaft 130 and a rear output shaft 131 for driving the front pair of tires and the rear pair of tires, respectively.

Now, the reference will be made further to the gear shift operation of the auxiliary transmission according to the present invention in conjunction with FIGS. 15 (A) through 15 (D).

Now, let us assume in definition with respect to the mutual relationship of the gears involved in the power transmission system such that the gear 117 has a number of gear teeth $Z_2=18$, the gear 118 having a number of gear teeth $Z_3=25$, the gear 123a having a number of gear teeth $Z_{1a}=11$, the gear 123b having a number of gear teeth $Z_{1b}=17$, the gear 124 having a number of gear teeth $Z_8=43$, and the gear 125 having a number of gear teeth $Z_9=37$. In other words, the mutual relationship between these gears in terms of number of teeth may be expressed in an inequality: $Z_{1a}<Z_{1b}<Z_2<Z_3<Z_9<Z_8$.

Figure 15C:
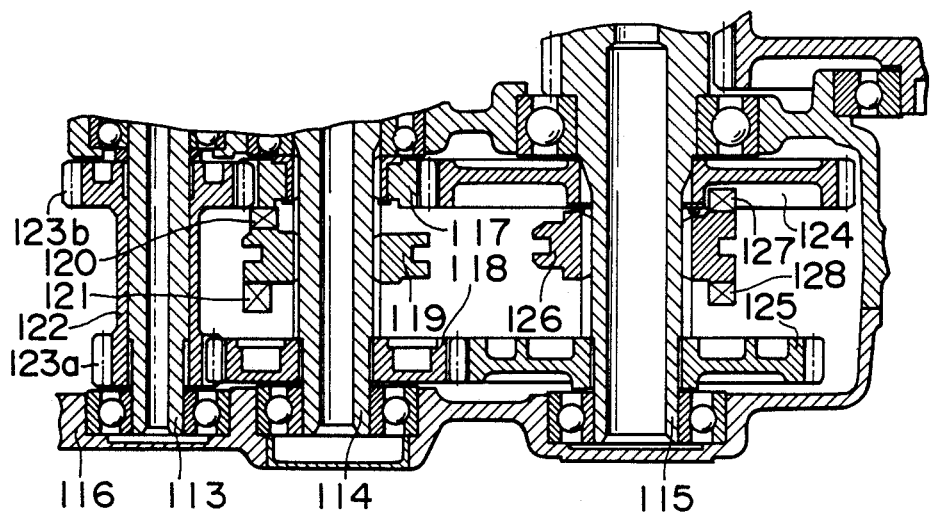
FIGS. 15 (A) through 15 (D) are schematic illustrations showing, in cross-section, the typical manner of operation of an axiliary transmission shown in FIG. 14.
Figure 15D:
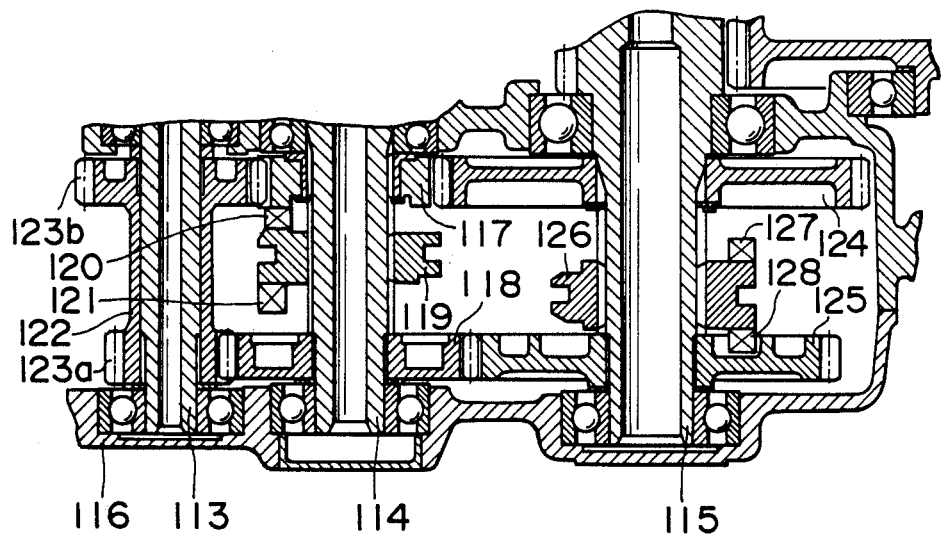

Firstly, FIG. 15 (A) shows a state of high gear range of the transmission system for the normal operation of the vehicle. In this state, it is arranged that the sliding wheel 119 has its dog clutch 121 put into engagement with the gear 118, with the dog clutch 127 of the sliding wheel 126 coming into intermeshing relationship with the gear 124. With this position, the route of power transmission is such that the rotating motion of the drive shaft 114 is transmitted through the transmission routing comprising the sliding wheel 119, the gear 118, the gear teeth 123a and 123b of the gear 122, the gear 117, the gear 124 and the sliding wheel 126 to the secondary drive shaft 115.

The overall ratio "i" of reduction gears in the route shown in FIG. 15 (A) may be given by the equation:

$$i=(Z_{1a}/Z_3)\times(Z_2/Z_{1b})\times(Z_8/Z_2)=(11/25)\times(18/17)\times(43/18)=1.112$$

Next, referring to FIG. 15 (B), there is shown a state of middle gear range of the transmission system according to this invention for the operation on sands, the uphill or downhill traction, the light-duty tractive operation, etc. of the vehicle. In this gear position, unlike the state shown in FIG. 15 (A), it is noted that the sliding wheel 126 has its dog clutch 128 engaged in meshing with the gear 125. Through this power transmission route, the rotating motion on the drive shaft 114 is now transmitted by way of the sliding wheel 119, the gear 118, the gear 125 and the sliding wheel 126 to the secondary drive shaft 115.

The current ratio of reduction gears "i" may be expressed by the following equation:

$$i=Z_9/Z_3=37/25=1.480$$

Now, FIG. 15 (C) shows a state of low gear range of the power transmission system. In this position of gear shifting, it is seen that the sliding wheel 119 has its dog clutch 120 put in meshing engagement with the gear 117, while the dog clutch 127 of the sliding wheel 126 is in engagement with the gear 124. With this gear shifting position, it is notable that the rotating motion on the drive shaft 114 is now transmitted through the sliding wheel 119, the gear 117, the gear 124 and the sliding wheel 126 to the secondary drive shaft 115.

The current ratio of reduction gears "i" may be given by the expression:

$$i = Z_8/Z_2 = 43/18 = 2.388$$

Then, FIG. 15 (D) shows a state of working gear range of the power transmission system for the heavy-duty tractive operation of the vehicle. In this position of gear shifting, it is seen that the sliding wheel 119 has its dog clutch 120 engaged in meshing relationship with the gear 117, while having the dog clutch 128 of the sliding wheel 126 put in engagement with the gear 125. With the transmission routing in this position, the rotating motion on the drive shaft 114 is transmitted by way of the sliding wheel 119, the gear 117, the gear teeth 123b and 123a of the gear 122, the gear 118, the gear 125 and the sliding wheel 126 to the secondary drive shaft 115.

The current ratio of reduction gears "i" may be given by the expression:

$$i = (Z_{1b}/Z_2) \times (Z_3/Z_{1a}) \times (Z_9/Z_3) = (17/18) \times (25/11) \times (37/25) = 3.176$$

More specifically, according to the auxiliary transmission as shown in FIG. 14, and FIGS. 15 (A) through (D), it is notable that the nominal ratio of the current ratio of working gear range for the maximum gear redution, namely 3.176 to the current ratio of high gear range for the minimum gear reduction, namely 1.112 will then be 2.86 in terms of the maximum reduction ratio/the minimum reduction ratio, which mean that there is attained such a nominal ratio as 89% greater than the typical ratio of 1.51 of the conventional design.

With the attainment of this nominal ratio of the power transmission system according to this invention, it is now appreciated that the eventual nominal ratio of reduction gear ratios turns out to be as great as 9.6 in the entire transmission system, which would be an ideal nominal ratio for an extensive range of operations such as on irregular grounds, uphill traction or like heavy-duty operations of the vehicle, accordingly.

While the description on the improved power transmission system dislcosed herein by way of the preferred embodiments of the present invention is essentially directed in application to a light four-wheeled vehicle of saddle-riding type, it is to be understood that the invention is not intended to be restricted in application to the details of the specific constructions disclosed herein, but to contrary, the invention can of course be adapted equally by any vehicles of other types like a passenger car, a light truck or the like vehicles, in accordance with the foregoing teachings without any restriction thereto and without departing from the spirit and scope of the invention.

It is also to be understood that the appended claims are intended to cover all of such generic and specific features particular to the invention as disclosed herein and all statements relating to the scope of the invention, which might as a matter of language be taken to fall thereunder.

What is claimed is:

1. A power transmission system of a saddle type vehicle for driving on irregular ground, said vehicle defining a longitudinal direction, having a body, having two balloon-tired front wheels and two balloon-tired rear wheels on said body, and an engine having a crankcase and having a crank shaft, a counter shaft, a drive shaft and a secondary drive shaft all in parallel with each other almost in the center of said body of said vehicle and a transmission disposed at right angles to said longitudinal direction of said body of said vehicle, which comprises an output shaft of a secondary transmission for driving said front and rear wheels through said secondary drive shaft, said output shaft being approximately centrally disposed adjacent a bottom surface of said crankcase of said engine and along said longitudinal direction of said body of said vehicle, said output shaft of said secondary transmission is connected operatively to said secondary drive shaft disposed in said crank casing by way of a bevel gear transmission means, said crank casing is of a vertical-split type that is split centrally into right and left counterparts, and said output shaft is mounted rotatably adjacent surfaces defining a joint generally centrally of said crank casing and between said right and left counterparts.

2. A power transmission system of a saddle-type vehicle for driving an irregular ground, said vehicle having a body and defining a longitudinal direction, having two balloon-tired front wheels and two balloon-tired rear wheels on said body of said vehicle and an engine having a crankcase and having a crank shaft, a counter shaft, a drive shaft and a secondary drive shaft all in parallel with each other almost in the center of said body of said vehicle and a transmission disposed at right angles to said longitudinal direction of said body of said vehicle, which comprises an output shaft of a secondary transmission for driving said front and rear wheels through said secondary drive shaft, said output shaft being approximately centrally disposed adjacent a bottom surface of said crankcase of said engine and along said longitudinal direction of said body of said vehicle, said drive shaft and said counter shaft being extended into spare space outside a transmission bearing, two gears mounted loosely movable relative to said drive shaft, a first sliding wheel provided slidably between said two gears and engageable with either of said two gears, a gear carrier mounted loosely movable relative to said extended counter shaft and having two gears in meshing engagement with each of said two gears on said drive shaft respectively, two gears are mounted loosely movable relative to said secondary drive shaft and in meshing engagement with each of said two gears on said drive shaft respectively, and a second sliding wheel slidably provided between said two gears on said secondary drive shaft and engageable with either of said two gears so that said first and second sliding wheels can be selectively positioned thereby enabling different speed ratios to be obtained.

* * * * *